Patented Dec. 29, 1936

2,066,054

UNITED STATES PATENT OFFICE 2,066,054

SURFACE ALLOYED CASTING

William J. Priestley, New Rochelle, N. Y., assignor, by mesne assignments, to Union Carbide and Carbon Corporation, a corporation of New York No Drawing. Application January 20, 1934, Serial No. 707,503

2 Claims. (Cl. 22—203)

This invention relates to composite or surface-alloyed articles or metal castings, and to methods of producing such articles or castings.

An object of this invention is to produce a surface-alloyed article having a core or base consisting of a material having a thermal and electrical conductivity similar to that of copper, and a case, or a surface, which is highly resistant to wear, corrosion, and high temperature oxidation.

Another object of this invention is to provide a process suitable for producing such a surface-alloyed article.

It has been proposed heretofore to provide ferrous metals or alloys with a protective layer or facing by coating the corresponding surface or surfaces of the mold in which the casting is to be formed with a material having the desired surface characteristics, said material being in a more or less finely divided or comminuted condition. A molten ferrous metal or alloy having a melting point close to the melting point of the comminuted material is then poured into the mold to form the main body of the casting, whereby the comminuted material is melted and the surface of the casting is coated with the material with which the mold had been lined.

I have discovered that the principles of the above-mentioned method are also suitable for producing articles in which the individual elements or ingredients which are to be embodied in the surface layer or layers of a casting have a melting point higher than the melting point of the base metal, provided the core material comprises copper or a metal or metallic composition having properties similar to copper, and the case material comprises a certain alloy more fully described hereinafter. It is frequently desirable to produce articles of which the core or base has a thermal and electrical conductivity similar to that of metallic copper, and of which the surface or case possesses a high resistance to wear, corrosion, and high temperature oxidation. While copper has a high thermal and electrical conductivity, it has but little resistance to wear, abrasion, corrosion, and oxidation at high temperatures. On the other hand, certain alloys, notably those high in chromium, are resistant to wear, abrasion, corrosion, and high-temperature oxidation, but have relatively low thermal and electrical conductivity. For many articles, e. g., glass molds and molds for molten metals such as brass and copper, tuyère nozzles for blast furnaces and other industrial furnaces, stools for ingot molds, spot welding electrodes, or cooling rings on carbon electrodes, it is desirable to have a non-homogeneous structure of which the base or core material possesses the favorable electrical and thermal properties of metallic copper, and of which the case or surface material has the hardness and resistance to corrosion, abrasion, and high temperature oxidation of the chromium alloys. However, it has not been possible heretofore to produce a casting in which a superficial layer or case of chromium is directly and uniformly bonded or alloyed to a firmly adherent base or core of copper. On the other hand, since pure chromium and pure copper alone do not alloy in proportions above about 8% of chromium or about 8% of copper, it has not been possible to provide a chromium-copper alloy sufficiently high in chromium to have the desired physical properties mentioned, together with the desired metallurgical properties to cause it to alloy with a base of copper. In order to produce a surface alloy sufficiently resistant to the wear, corrosion, and high temperature oxidation contemplated by this invention, the chromium content of the surface layer must be at least about 12%.

In accordance with this invention, the above-mentioned objects may be attained by providing a metallic base of relatively soft and highly conductive metallic material such as copper, and surface-alloying such a base material with certain metallic compositions in which at least about 12% of chromium is associated with copper, said compositions containing a suitable carrier or fusion-assisting agent which enables the chromium to alloy with the copper in amounts greater than about 8%. A carrier or alloying agent suitable for the purposes of this invention has been found to be silicon, and a metallic composition or alloy which contains silicon together with the other ingredients in the proportions required in accordance with this invention has been disclosed and claimed in U. S. Patents 2,058,375 and 2,058,376 issued October 20, 1936, to James H. Critchett.

In accordance with a preferred method of practicing this invention, there is first produced a finely divided, metallic composition, such as described in the patents referred to above, which contains about 40% to 12% chromium, 20% to 40% copper, about 10% to 30% silicon, not more than about 5% carbon, and the remainder iron. This may be produced either by mixing the ingredients in powdered form or by comminuting the alloy itself into finely divided particles. In both instances the size of the particles should be approximately 30 to 80 mesh, (average width of sieve openings about 1.8 to 0.6 millimeters).

These powdered particles are then preferably mixed with about 80 to 100 parts by weight of a suitable tacky binding agent, such as water glass for example, and the mixture is then applied to the surface of a mold which is to be used for forming an article or casting in accordance with this invention. Molten copper or a similar highly conductive metal or alloy is then cast into the coated mold. When copper or its equivalent is used as the base metal, since the melting point of the above described chromium-copper-silicon-iron composition is about that of copper, and since the presence of the silicon facilitates a certain alloying action of the copper and chromium of the coating composition, the coating composition is readily melted and absorbed from the mold lining into the surface layers of the molten base metal. There is thus produced, upon solidification of the base metal, a surface-alloyed article having a firmly-adhering hard case, since its surface consists of an alloy containing chromium, copper, silicon and iron substantially within the proportions used in the mold lining. However, owing to a certain diluting action which is produced by the contact of the molten base metal with the mold lining during the casting operation, the relative proportions of the metals composing the case may vary somewhat, depending to some extent upon the base metal, and the silicon content of the surface of the cast article may be reduced to about 5%. Thus, the surface layers of the article thus produced are rendered resistant to wear, abrasion, corrosion, and to high temperature oxidation, while at the same time the high thermal and electrical conductivity of the base copper metal or alloy of the core is retained unaffected. This advantageous combination of desirable and valuable properties renders the method described particularly suitable for the manufacture of castings or articles which are subjected simultaneously or singly to a high temperature, and to wear, abrasion or other adverse physical, chemical or electrical influences. Examples of such uses are to be found in tuyères and nozzles for blast furnaces and other industrial furnaces, cooling rings on carbon electrodes, etc. When applying the principles of this invention to the production of tuyères or nozzles, for example, the particular novel and advantageous effect of a surface-alloyed article as described herein, when used for injecting granular materials such as powdered fuel into an industrial furnace, is that the useful life of the nozzle is increased several fold as compared to an ordinary nozzle. This is due to the combination of the high thermal conductivity of the body of the nozzle which functions to conduct the heat rapidly away from the surface to dissipate it in the furnace structure, as well as to the hardened wear and oxidation resisting condition of the surface which prevents abrasion and high temperature oxidation and scaling.

It will be understood that the methods and articles described herein may be modified in numerous particulars without departing from the spirit and scope of this invention as defined in the following claims.

I claim:

1. Method of producing a copper base metal casting having high thermal and electrical conductivity and improved resistance to wear, corrosion, and oxidation at high temperatures, which method comprises casting a copper base metal having high thermal and electrical conductivity in a mold lined with finely divided coating and surface alloying metal having the following composition: 20% to 40% copper which promotes the formation of a strong bond with the base metal, 40% to 12% chromium which imparts resistance to wear, corrosion, and oxidation, 10% to 30% silicon which makes the coating metal homogeneous when molten, and the remainder iron and carbon present in substantial amounts not exceeding 30% iron and 5% carbon.

2. A copper base metal surface alloyed casting having high thermal and electrical conductivity and improved resistance to wear, corrosion, and oxidation at high temperatures, which casting comprises a copper base metal cast body portion of high thermal and electrical conductivity, and, surface alloyed with said body portion, a surface layer having good resistance to wear, corrosion, and oxidation at high temperatures; said surface layer having the following composition: 20% to 40% copper which promotes the formation of a strong bond with the base metal, 40% to 12% chromium which imparts resistance to wear, corrosion, and oxidation, 10% to 30% silicon which makes the surface layer homogeneous, and the remainder iron and carbon present in substantial amounts not exceeding 30% iron and 5% carbon.

WILLIAM J. PRIESTLEY.